United States Patent
Huang et al.

(10) Patent No.: US 7,333,086 B2
(45) Date of Patent: Feb. 19, 2008

(54) DUAL MODE COMPUTER MOUSE

(75) Inventors: Hsun-Li Huang, Hsinchu (TW); Chun-Hsiung Yin, Tainan (TW)

(73) Assignee: QISDA Corporation, Taoyuan County (TW)

( * ) Notice: Subject to any disclaimer, the term of this patent is extended or adjusted under 35 U.S.C. 154(b) by 572 days.

(21) Appl. No.: 10/982,904

(22) Filed: Nov. 8, 2004

(65) Prior Publication Data
US 2005/0116933 A1 Jun. 2, 2005

(30) Foreign Application Priority Data
Dec. 2, 2003 (TW) .............................. 92133940 A

(51) Int. Cl.
G09G 5/00 (2006.01)
(52) U.S. Cl. ...................... 345/156; 345/163; 345/179; 178/18.01
(58) Field of Classification Search ........ 345/156–179, 345/184; 178/18.1–18.9
See application file for complete search history.

(56) References Cited

U.S. PATENT DOCUMENTS

| | | | | |
|---|---|---|---|---|
| 5,434,594 A | * | 7/1995 | Martinelli et al. | 345/163 |
| 5,764,224 A | * | 6/1998 | Lilja et al. | 345/179 |
| 6,043,807 A | * | 3/2000 | Carroll | 345/163 |
| 6,184,869 B1 | * | 2/2001 | Harding et al. | 345/163 |
| 7,030,864 B2 | * | 4/2006 | Yueh | 345/179 |
| 2004/0032392 A1 | * | 2/2004 | Chi et al. | 345/156 |

* cited by examiner

Primary Examiner—Richard Hjerpe
Assistant Examiner—Leonid Shapiro
(74) Attorney, Agent, or Firm—Rabin & Berdo, PC

(57) ABSTRACT

A dual mode computer mouse including a first mouse body and a second mouse body is disclosed. The first mouse body includes a first sensor, a first button and at least a second button. A second sensor is disposed either in the first or the second mouse body. The second mouse body includes a third button and is hinged to one tail end of the first mouse body. The first mouse body and the second mouse body can rotate relatively. When the dual mode computer mouse is in a palm-type configuration, the first button and, third button and the second sensor are activated. When the dual mode computer mouse forms a pen-type configuration, the third button is activated and the first sensor is in an activated state.

24 Claims, 11 Drawing Sheets

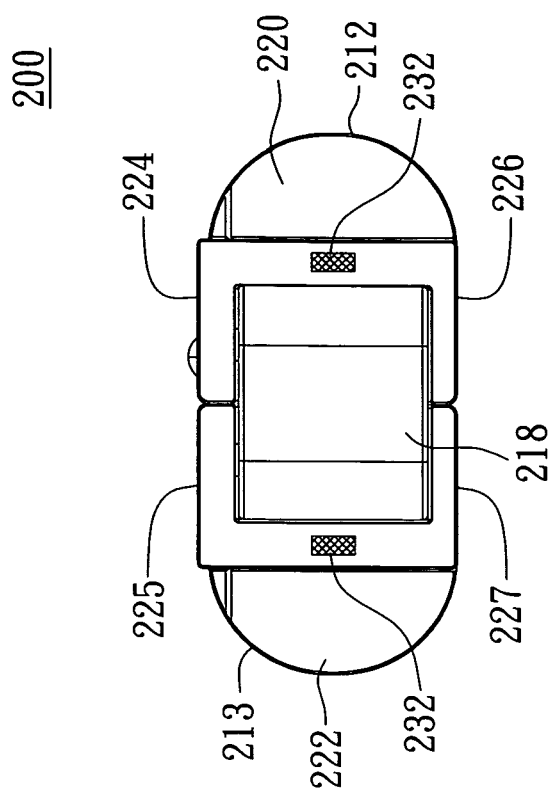
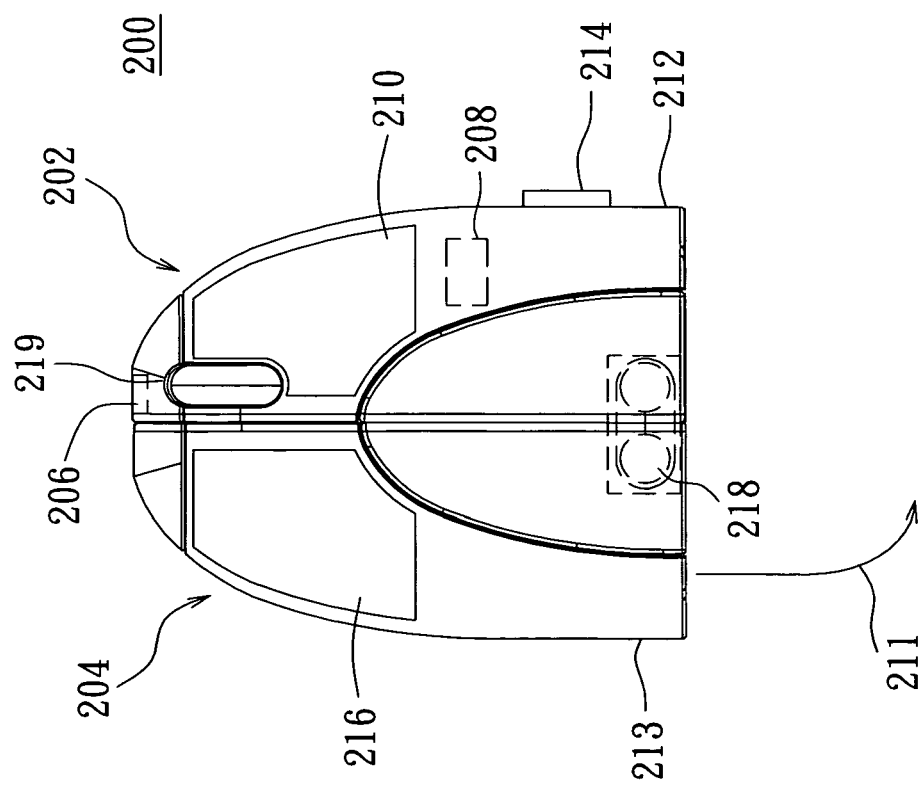
FIG. 2B
FIG. 2A

DUAL MODE COMPUTER MOUSE

This application claims the benefit of Taiwan application Serial No. 92133940, filed Dec. 2, 2003, the subject matter of which is incorporated herein by reference.

BACKGROUND OF THE INVENTION

1. Field of the Invention

The invention relates to a dual mode computer mouse, and more particularly to an optical mouse, which is able to present in a form of pen-like operable configuration.

2. Description of the Related Art

Referring to FIG. 1 is a side view of a conventional pen-like computer pointing device. The pen-like computer pointing device 100 is characterized by its ergonomic pen-like design. Users are able to operate the pointing device 100 in a manner like holding a pen. The body 102 of the pointing device 100 is provided with a top surface 104 with two buttons, 106 and 108 disposed thereon. And users can operate by one single finger. The location of the pointing device can be determined and the shifting of the corresponding cursor can be controlled with an aid of the sensor. The sensor is equipped on a bottom surface 110. Although the pen-like computer pointing device can reduce the chances of muscular injury, the users cannot choose ideal holding manner to cope with different software. More over, users can only operate the buttons by index finger. Long use of the index finger causes finger fatigue and users' inconvenience.

SUMMARY OF THE INVENTION

It is therefore an object of the invention to provide a dual mode computer mouse for users to select an ideal holding manner to cope with varied software from changes in different operable configuration. Therefore, the workloads of single finger and the inconvenience in use are alleviated.

In accordance with the objectives of the invention, it provides a dual mode computer mouse. The dual mode computer mouse includes the first mouse body and the second mouse body. The first sensor is disposed on the first mouse body and the first button is disposed on the top surface of the first mouse body. The outer sidewall of the first mouse body is equipped with at least the second button. The second mouse body was hinged to one tail end of the first mouse body. And the third button is disposed on the second top surface of the second mouse body. The first mouse body and the second mouse body can rotate relatively. When the first mouse body and the second mouse body are parallel forming a palm-type operable configuration, the functions of the first button and the third button are activated. When the second mouse body relatively rotates to be in line with the first mouse body, and the second mouse body and the first mouse body are presented in a form of pen-like operable configuration, the function of the second mouse body is activated and the first sensor is enabled.

It is another objective of the invention to provide a dual mode computer mouse for users to operate the mouse in different operable configuration wherein the dual mode computer mouse includes the first mouse body and the second mouse body. The first mouse body includes a top surface which is disposed the first button, the first bottom surface, the first outer sidewall, at least the second button, the first engaging sidewall and the first engaging end. The first outer sidewall connects the first top surface with the first bottom surface. The second button is disposed on the first outer sidewall. The first engaging sidewall connects the first top surface and the first bottom surface, and the first engaging sidewall is disposed corresponding to the first outer sidewall. The second mouse body is hinged to the first mouse body. The second mouse body includes the second top surface which is equipped with the third button, the second bottom surface, the second outer sidewall, the second engaging sidewall and the second engaging end. The second outer sidewall substantially corresponds to the first outer sidewall with symmetry and connects the second top surface with the second bottom surface. The second engaging sidewall substantially corresponds to the first engaging sidewall and connects the second top surface with the second bottom surface, wherein the second engaging sidewall is disposed corresponding to the second outer sidewall. The second engaging end substantially corresponds to the first engaging end, up-down connects the second top surface with the second bottom surface and left-right connects the second outer sidewall with the second engaging sidewall. When the first engaging sidewall of the first mouse body and the second engaging sidewall are engaged together, the first mouse body and the second mouse body lay side by side, which resulting in the first and third button are activated and the second sensor is enabled. On the other hand, when the first engaging end and the second combination plane are engaged together by ways of relatively rotating the second mouse body to be line with the first mouse body and the second mouse body are in a pen-like configuration and consequently, the functions of the second button and third button are activated, and the first sensor is enabled.

It is another object of the present invention to provide a computer mouse, which includes the first mouse body, the second mouse body, the first button and the third button. The first mouse body is provided with the first top surface, the first engaging sidewall and the first engaging end. The second mouse body is provided with the second top surface, the second engaging sidewall and the second engaging end, wherein the second mouse body is hinged to the first mouse body and consequently, the second mouse body can rotate relatively to the first mouse body. The first button is disposed on the first top surface and the third button is disposed on the second top surface. The connection of the first engaging sidewall and the second engaging sidewall enables users to hold the mouse with putting their palm on the top of the mouse and to operate the first button and third button by their fingers. On the other hand, the connection of the first engaging end and the second engaging end enables the user to hold the first mouse body and to operate the first button by their fingers.

BRIEF DESCRIPTION OF THE DRAWINGS

FIG. 2A is a vertical view of a palm-type operable configuration of the dual mode computer mouse according to the first preferred embodiment of the present invention.

FIG. 2B is an end view of a palm-type operable configuration of the dual mode computer mouse according to the first preferred embodiment of the present invention.

DETAILED DESCRIPTION OF THE INVENTION

Embodiment I

Figure 1:
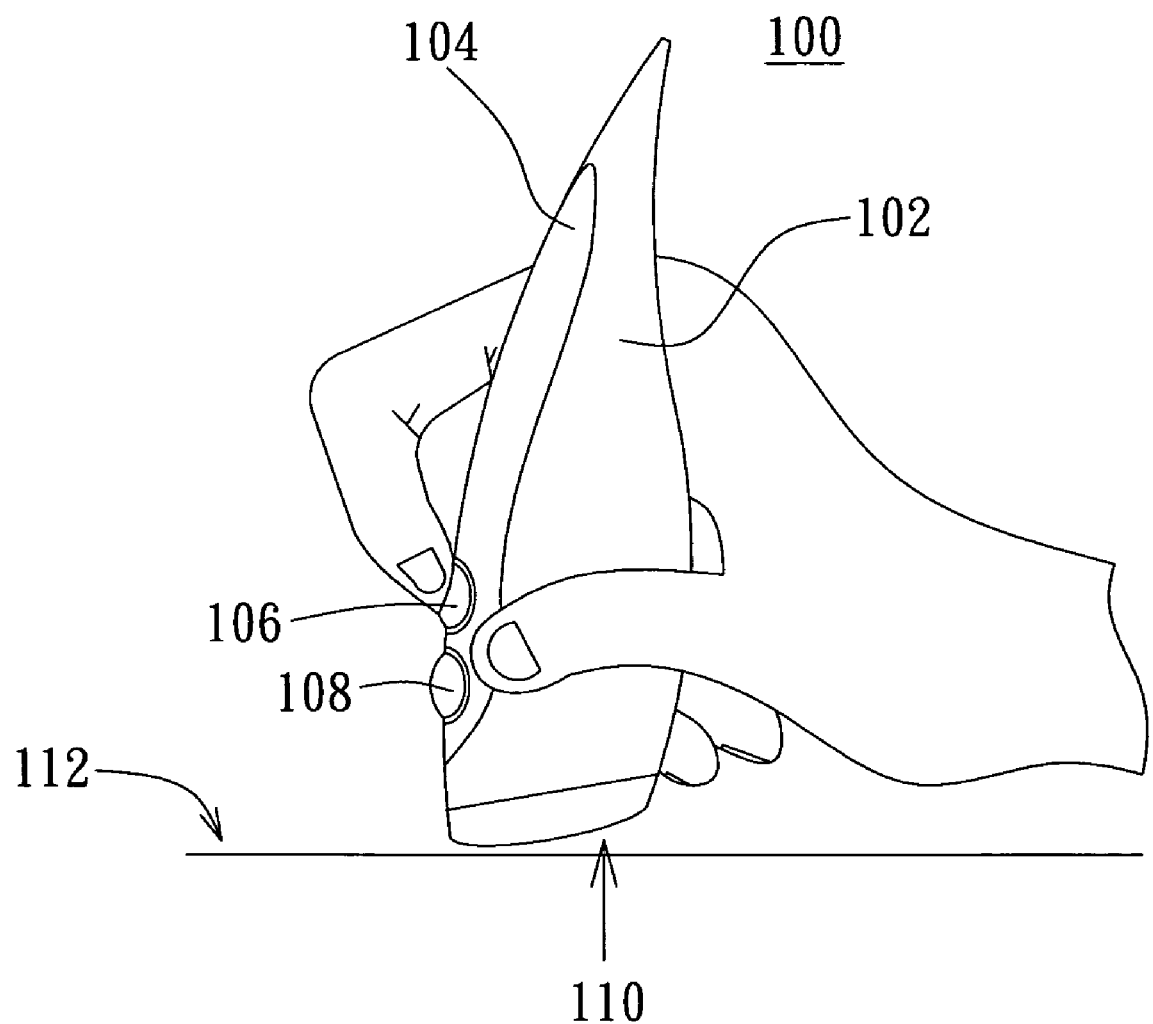
FIG. 1 (Prior Art) is an end view of pen-type computer pointing device.
Figure 2C:
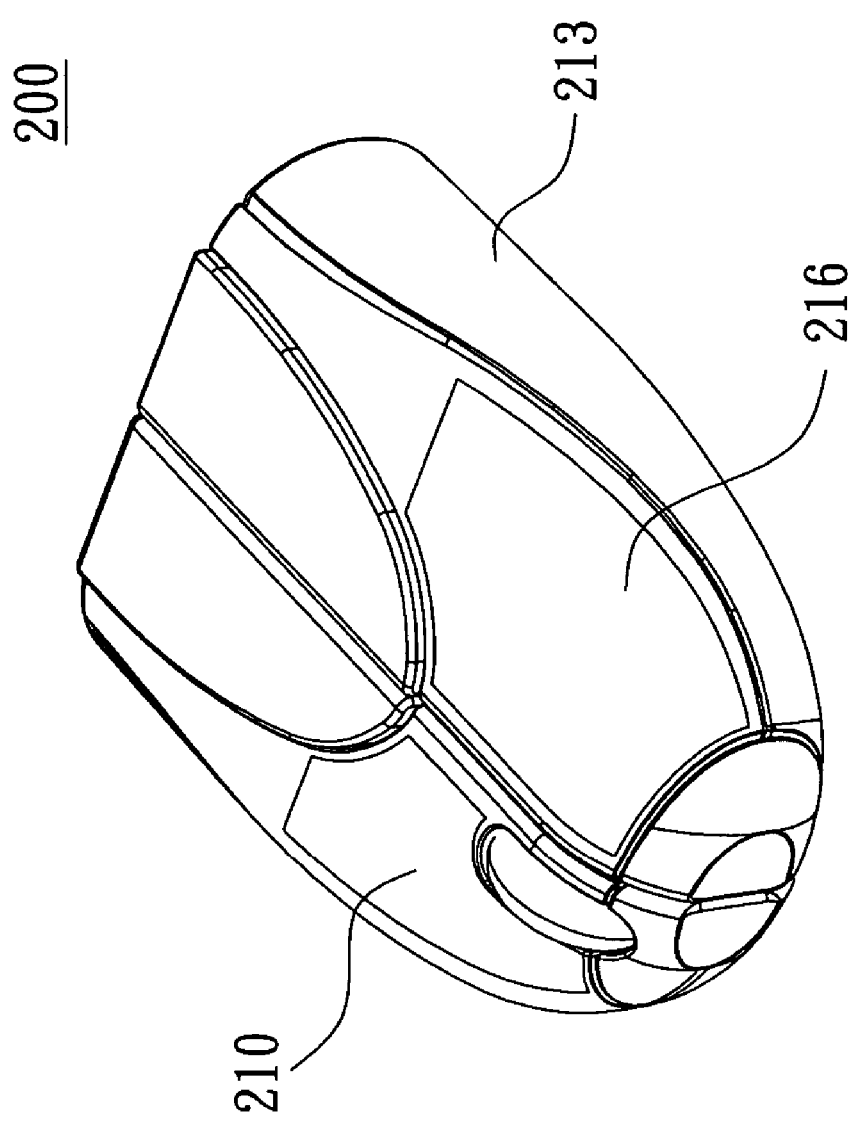
FIG. 2C is a three-dimensional view of palm-type operable configuration of the dual mode computer mouse according to the first preferred embodiment of the present invention.

Referring to FIG. 2A to FIG. 2C, a dual mode computer mouse 200 includes the first mouse body 202 and the second mouse body 204. The first sensor 206 is disposed on the first mouse body 202, and the first button 210 is disposed on the first top surface 224 of the first mouse body 210. At least the second button 214 is disposed on the first outer sidewall 212 of the first mouse body 202. An outer sidewall, such as the first outer sidewall 212, connects the first top surface 224 with the first bottom surface 226. The second mouse body 204 is hinged to one tail end of the first mouse body 202. Therefore, the first mouse body 202 and the second mouse body can rotate relatively. The third button 216 is disposed on the second top surface 225 of the second mouse body 204. An outer sidewall of the second mouse body 204, such as the second outer sidewall 213, substantially corresponds to the first outer sidewall 212 and connects to the second top surface 225 and the second bottom surface 227.

When the first mouse body 202 and the second mouse body 204 are side by side to form a palm-type operable configuration, the first button 210 and the third button 214 are activated. The second mouse body 204 and first mouse body 202 presented as a serial pen-like operable configuration while the second mouse body 204 is rotated along a rotational direction 211 to be in-line with the first mouse body. The rotational degree is preferably to be 180 degree. On the other hand, the second mouse body 204 and the first mouse body 202 can be presented as a serial pen-like operable configuration, while the second button 216 is activated and the first sensor is enabled. In other words, when the dual mode computer mouse is in a palm-type operable configuration as illustrated in FIG. 2A to FIG. 2C, users can hold the mouse by palm. When the computer mouse is in a pen-like operable configuration, users can hold the computer mouse 200 like holding a pen.

Additionally, the dual mode computer mouse 200 further includes the second sensor 208. The first mouse body 202 further includes the first bottom surface 226 opposite to the first top surface 224. The second mouse body 204 further includes the second bottom surface 227 opposite to the second top surface 225. The second sensor 208 can be selectively disposed on either the first bottom surface 226 or the second bottom surface 227. When the first bottom surface 226 makes a motion on a placing plane, namely the working plane 112, the second sensor 208 can detect the motion of the mouse.

Figure 2D:
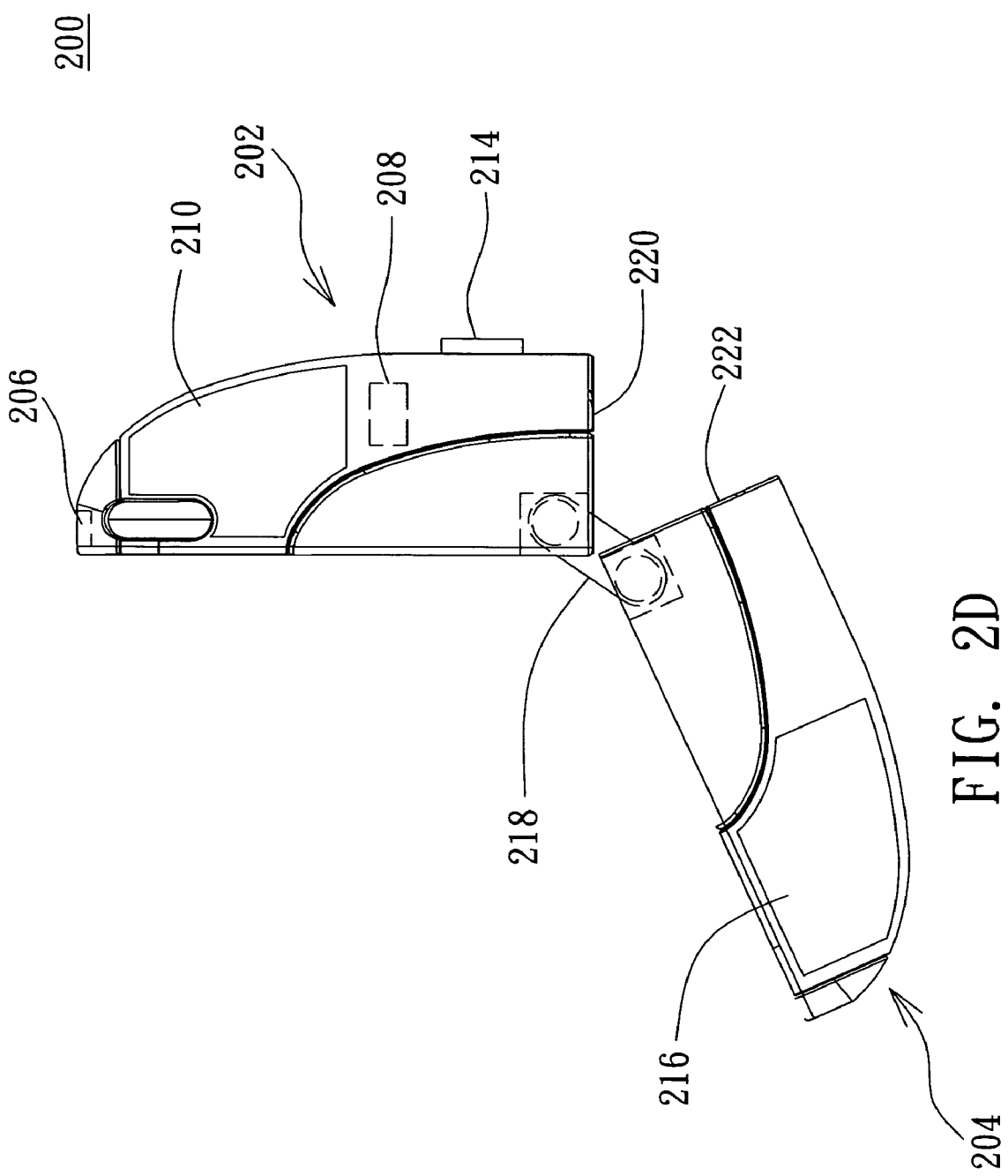
FIG. 2D illustrates a vertical view of the dual mode computer mouse which lie in between palm-type operable configuration and pen-like operable configuration depicted in FIG. 2A.
Figure 2E:
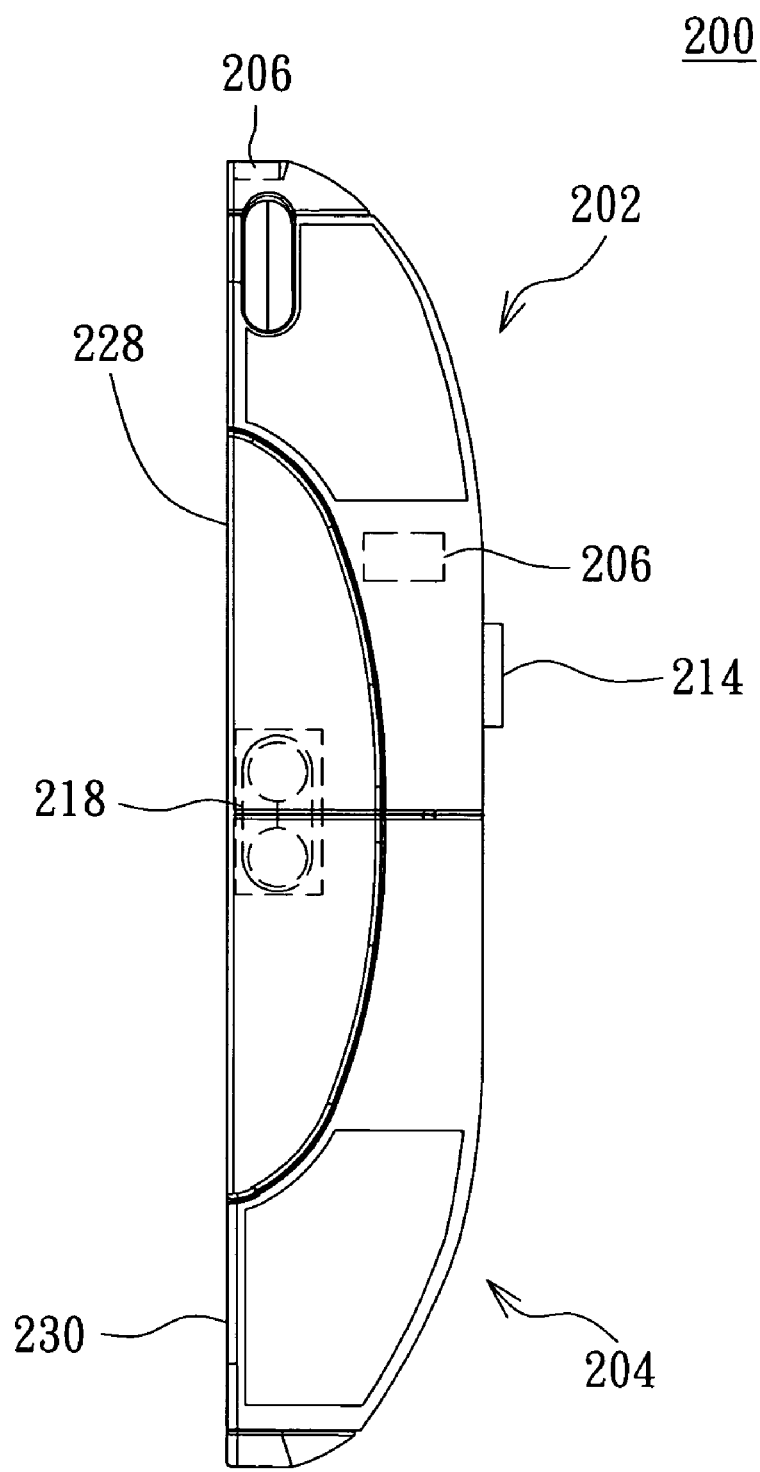
FIG. 2E is a vertical view of pen-like operable configuration of the dual mode computer mouse depicted in FIG. 2A.

Referring to FIG. 2A, FIG. 2D and FIG. 2E, the dual mode computer mouse further includes a hidden dual hinges 218 for hinging the first mouse body 202 with the second mouse body 204. The first mouse body 202 and the second mouse body 204 can rotate relatively and convert into different operable configuration with an aid of the hidden dual hinges 218. Regardless of palm-type operable configuration or pen-like operable configuration, the hidden dual hinges will not protrude from the sidewall of the dual mode computer mouse 200. Therefore, beauty and practical utility of the dual mode computer can be maintained.

Figure 3A:
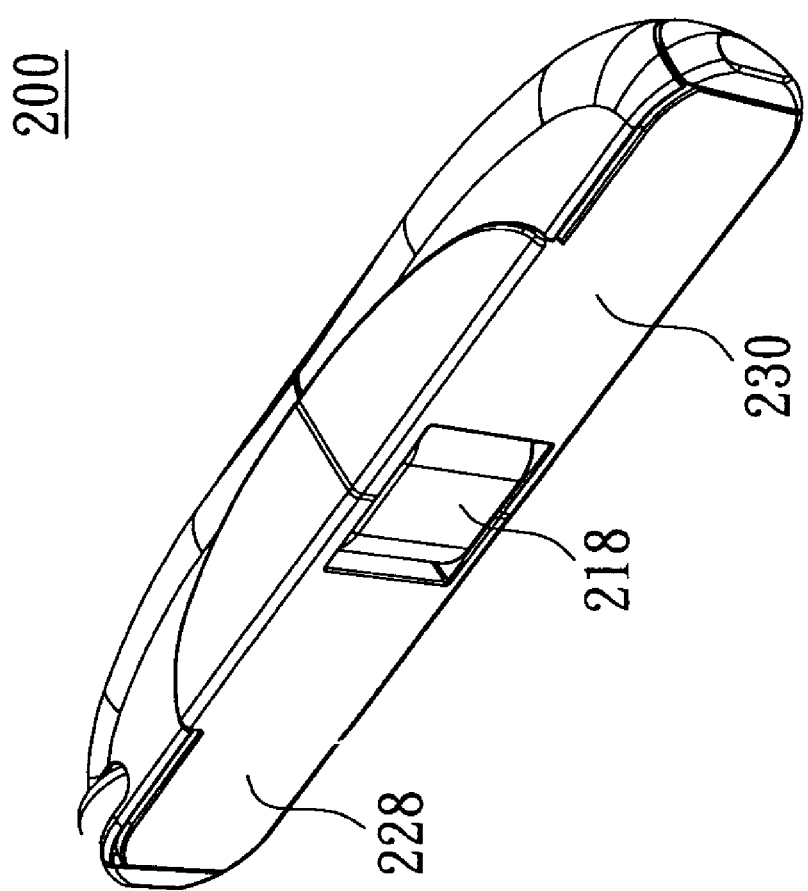
FIG. 3A is a three-dimensional view of pen-like operable configuration of the dual mode computer mouse according to the first preferred embodiment of the present invention.
Figure 3B:
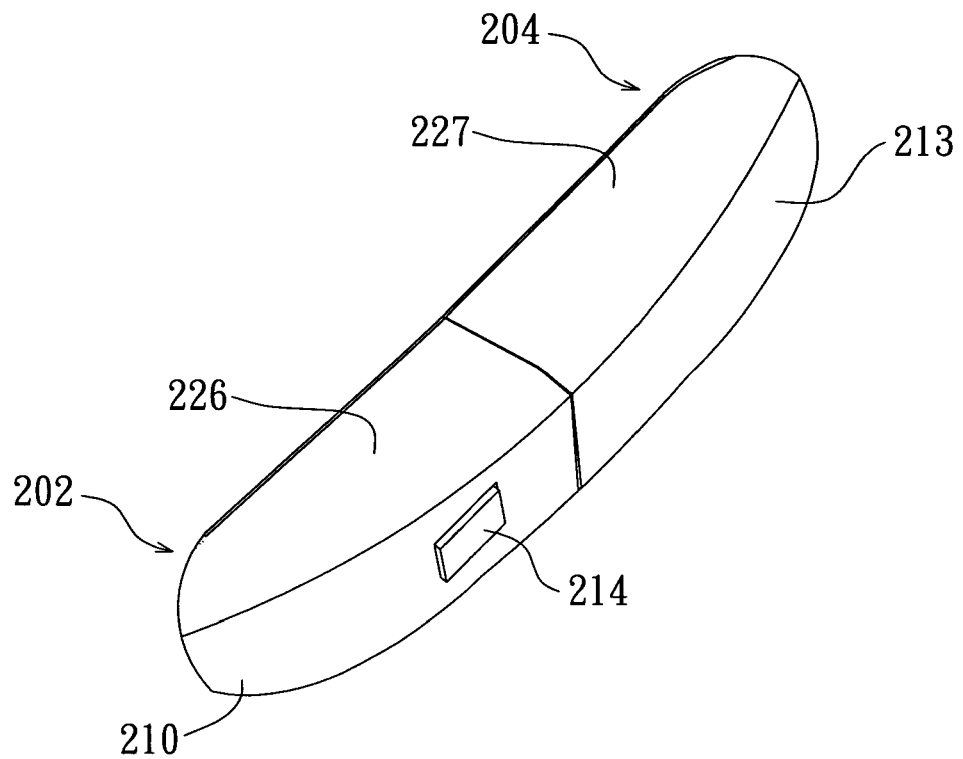
FIG. 3B is a three-dimensional view of another viewing angle of pen-like operable configuration of the dual mode computer mouse depicted in FIG. 3A.

Referring to FIG. 2B, FIG. 3A and FIG. 3B, as for the outward structure, the housing of the first mouse body 202 includes the first engaging sidewall 228 and the first engaging end 220. The first engaging sidewall 228 connects with the first engaging end 220 and the first engaging end 220 connects with the first outer sidewall 212. Each of the first engaging sidewall 228, the first engaging end 220 and the first sidewall 212 up-down connects the first top surface 224 and the first bottom surface 226. The first engaging sidewall 228 is disposed opposite to the first outer sidewall 212.

When the first engaging sidewall 228 of the first mouse body 202 and the second engaging sidewall 230 of the second mouse body 204 are engaged together, that is to say, the first engaging sidewall 228 and the second engaging sidewall 230 are not exposed, the second mouse body 204 and the first mouse body are side by side to form the palm-type operable configuration. At this time, users can hold the mouse with putting palms on the top of the dual mode computer mouse 200, and operate the first button 210 and third button 216 by fingers. On the other hand, when the first engaging end 220 of the first mouse body 202 and the second engaging end 222 of the second mouse body 204 are engaged together, this is to say, the first engaging end 220 and the second engaging end 222 are not exposed, the second mouse body 204 and the first mouse body 202 are presented in a pen-like operable configuration. At this time, users can hold the first mouse body 202 like holding a pen and operate one or more than one of the second buttons 214.

Figure 3C:
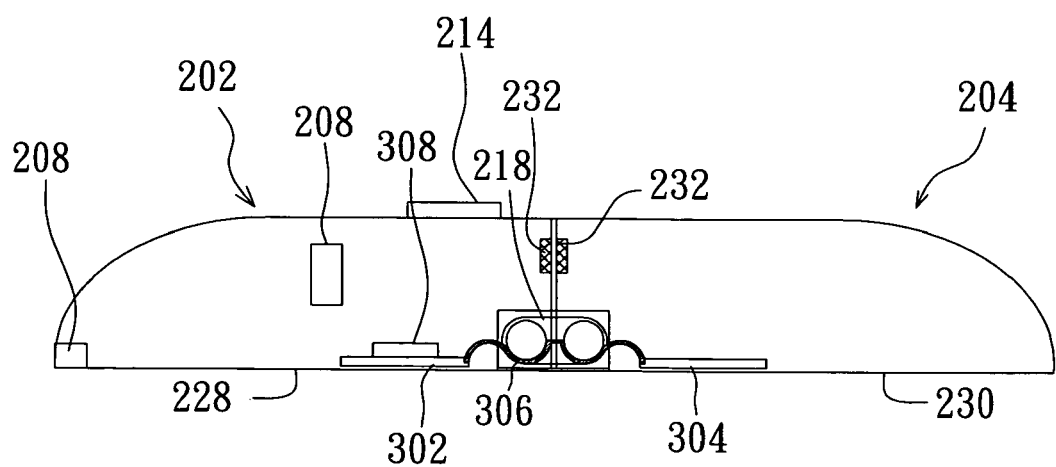
FIG. 3C illustrates the internal structure of pen-like operable configuration of the dual mode computer mouse depicted in 3A.

Referring to FIG. 3C, the first circuit board 302 is disposed inside the first mouse body 202. The first circuit board 302 is equipped with the first control circuit (no shown in the Figure), which is used to control the first mouse body. The second circuit board 304 is disposed inside the second mouse body 204. The second circuit board 304 is equipped with the second control circuit (no shown in the Figure), which is used to control the second mouse body 204. The first circuit board 302 and the second circuit board 304 are electrically coupled with an aid of a connecting material 306, such as a Flexible Flat Cable (FCC) or a Flexible Printed Circuit (FPC). The connecting material 306 couples these two circuit boards 302, 304 by penetrating through the hidden dual hinges 218. Two ends of the connecting material 306 electrically connect to first circuit board 302 and second circuit board 304, respectively. The above-mentioned accelerometer chip 310 can be disposed on either the first circuit board 302 or on the second circuit board 304.

It is noticeable that the dual mode computer mouse 200 can further include an accelerometer chip, which detects the inclination of the mouse. The accelerometer chip 308 can be disposed on the first circuit board 302. The model ADXL 203 chip of Analog Devices is an example of an accelerometer chip 308. The ADXL 203 chip can use gravity as input vector. The ADXL 203 chip can decide the inclination of the dual mode computer mouse according to the direction of the sensitive axis and output voltage signal of different voltage level. The voltage signal can be input to the first control circuit or the second control circuit.

When a user operates the dual mode computer mouse 200 in the palm-type operable configuration according to a preferred embodiment of the invention, the inclination of dual mode computer mouse 200 is smaller than the inclination of the dual mode computer mouse in the pen-like operable configuration and the voltage signal is at the first voltage level. At this time, the first control circuit and the second control circuit enable the second sensor 206 and meanwhile activate the first button 210 and the third button 216. On the contrary, when a user operates the dual mode computer mouse 200 in a pen-like operable configuration, the inclination of the dual mode computer mouse is larger than the inclination of the dual mode computer mouse in the palm-type configuration and the voltage signal is at the second voltage level. Thus, the first control circuit and the second control circuit enable the first sensor 208 and activate the second key 214 at the same time.

Moreover, the first engaging end 212 and the second engaging end are preferably provided with a magnet 232 on each end. The magnet 232 is used for attracting and positioning the first mouse body 202 and second mouse body 204 in the form of pen-like operable configuration. The same way of positioning can be applied to the first engaging sidewall 228 and the second engaging sidewall 230 and be used to position the second mouse body 204 and the first mouse body 202 in the form of side by side palm-type operable configuration. The dual mode computer mouse is preferably further provided with a scrolling wheel 217, which is disposed on the top surface 224. When the first engaging sidewall 228 and the second engaging sidewall 230 are engaged together, users can hold the mouse 200 from the top of the dual mode computer mouse 200 and roll the scrolling wheel 217 by fingers.

Embodiment II

Figure 4A:
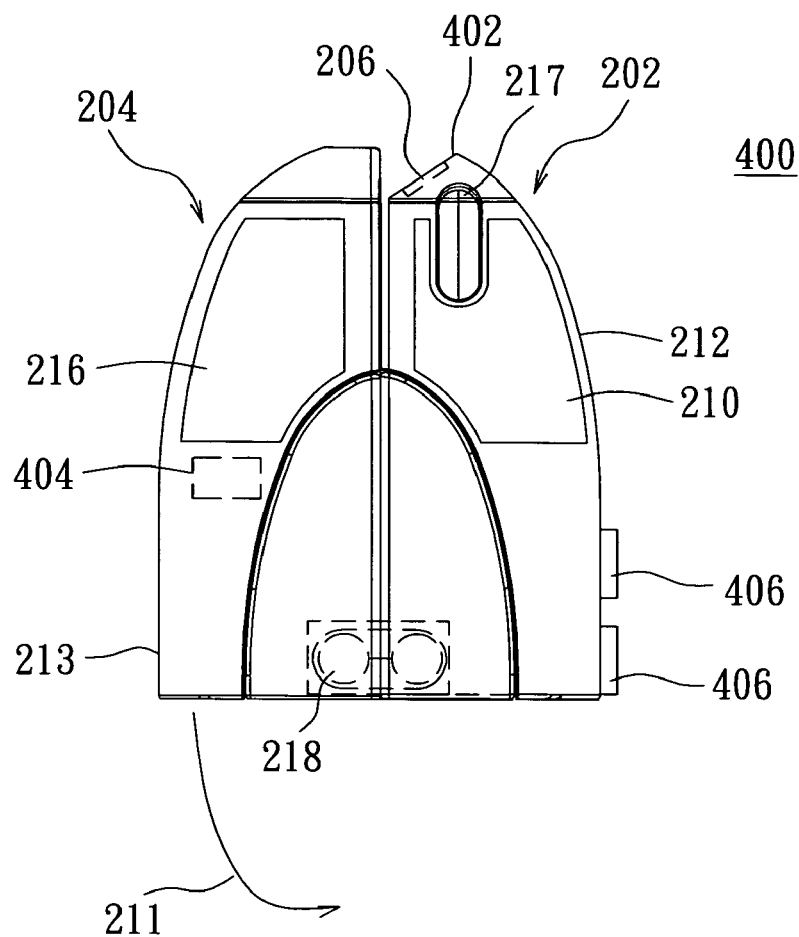
FIG. 4A is a vertical view of the dual mode computer mouse which is provided with the first contact plane according to the second preferred embodiment of the present invention.
Figure 4B:
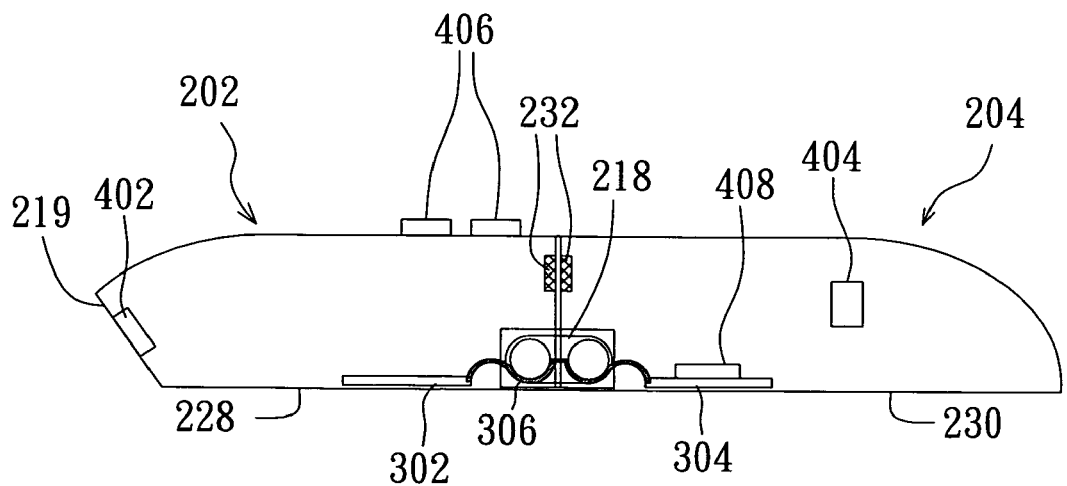
FIG. 4B is a side view of pen-like operable configuration of the dual mode computer mouse depicted in 4A.

Referring to FIG. 4A and FIG. 4B, the main differences between the dual mode computer mouse 400 and the dual mode computer mouse 200 of the first preferred embodiment are the existence of the first contact surface 402 on the leading edge of the first mouse body 202 of the dual mode computer mouse 400 and the existence of the second sensor 402 on the second bottom surface of the second mouse body 204 of the dual mode computer mouse 400. The rest of the essential elements of the dual mode computer mouse according to the second preferred embodiment adopt the same numbering as the first preferred embodiment and will not be mentioned again. The first contact surface 402 and the first engaging sidewall 228 lying at an angle in a range of 90 to 180 degree. The first sensor 206 is disposed on the first contact surface 402. When the dual mode computer mouse is in a pen-like operable configuration, or the contact surface 402 moves along a plane, the first sensor 206 can detect the motion of the dual mode computer mouse 400 as well as control the movement of the cursor on the screen.

The scrolling wheel 217 is disposed on the top surface 224 of the first mouse body 202. When the first engaging sidewall 228 and the second engaging sidewall 230 are engaged together, the users hold the mouse 400 form the top of the dual mode computer mouse 400 by palm and roll the scrolling wheel 217 by fingers. On the other hand, the first outer sidewall 212 of the dual mode computer mouse 400 is equipped with two second buttons 406 in order to built more functions in the computer mouse 400.

The dual mode computer mouse further includes an accelerometer chip 408, which detects the inclination. The accelerometer chip 408 is disposed on the second circuit board 304. When the dual mode computer mouse 400 is presented is the palm-type operable configuration, the inclination of the mouse 400 is smaller than the dual mode computer mouse in the pen-like operable configuration.

Embodiment III

The main differences between the dual mode computer mouse 500 according to the third embodiment and dual mode computer mouse 400 are that the existence of the scrolling wheel 502 on the second mouse body 204 of the dual mode computer mouse 500 and the existence of the second button 504 on the bottom surface 226 of the first mouse body 202 of the dual mode computer mouse 500. The rest of the essential elements adopt the same numbering and will not be mentioned again.

Figure 5A:
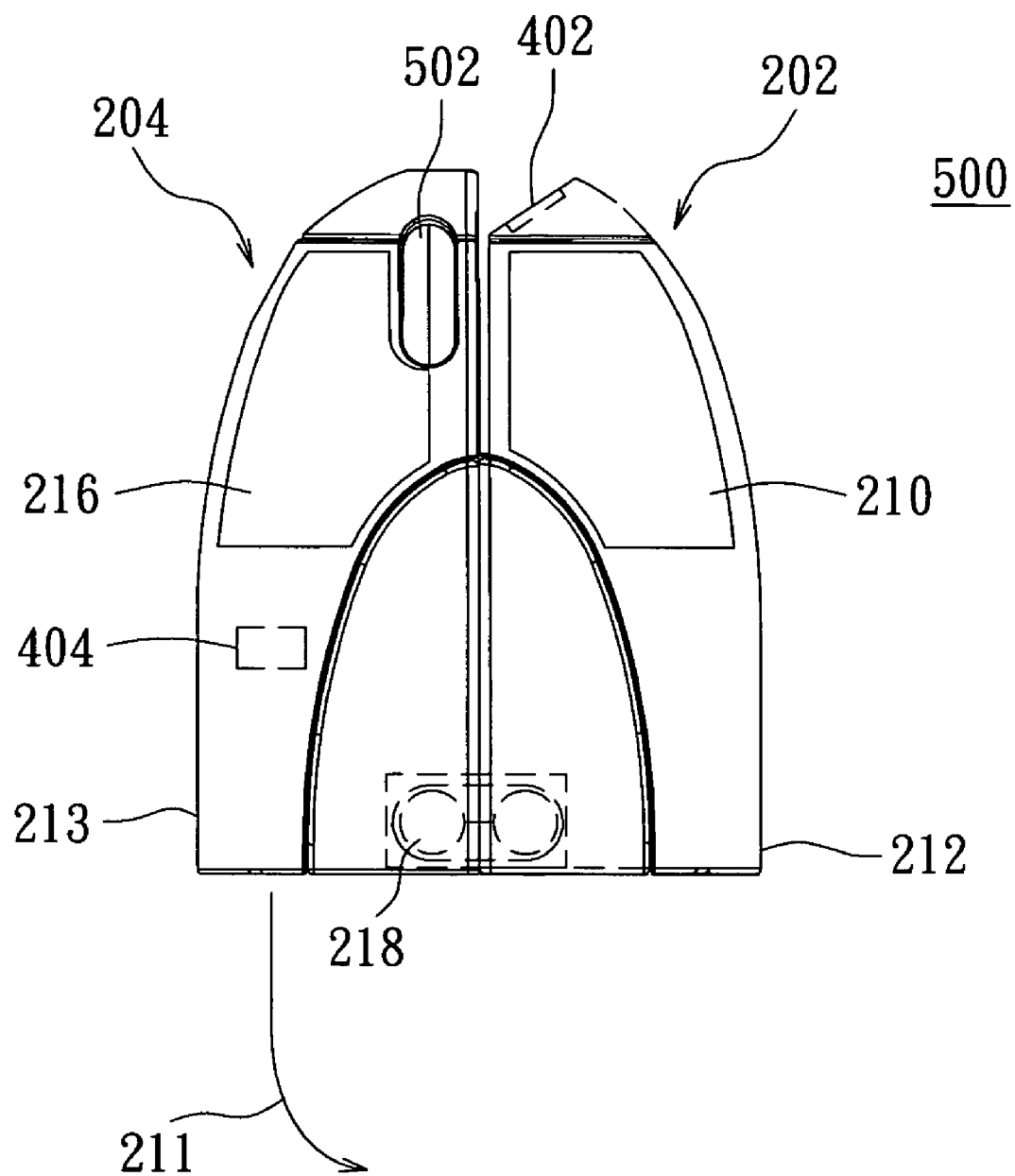
FIG. 5A is a vertical view of the dual mode computer mouse according to the third preferred embodiment of the present invention.

Referring to FIG. 5A, the scrolling wheel 5A is disposed on the second top surface 225 of the second mouse body 204. When the first engaging sidewall and the second engaging sidewall are engaged together, users can hold the mouse 500 from the top of the computer mouse 500 by palm and roll the scrolling wheel 502 by fingers.

Figure 5B:
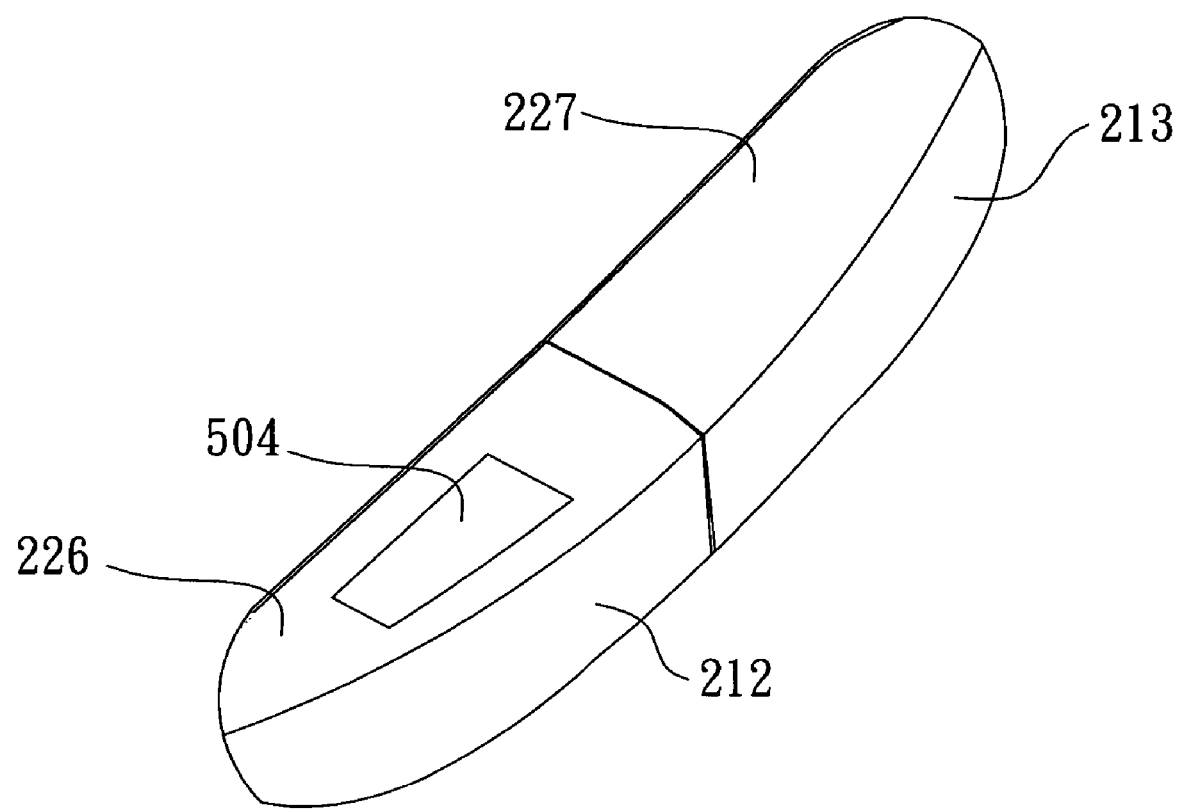
FIG. 5B is a three-dimensional view of pen-like operable configuration of the dual mode computer mouse depicted in 5A.
Figure 6:
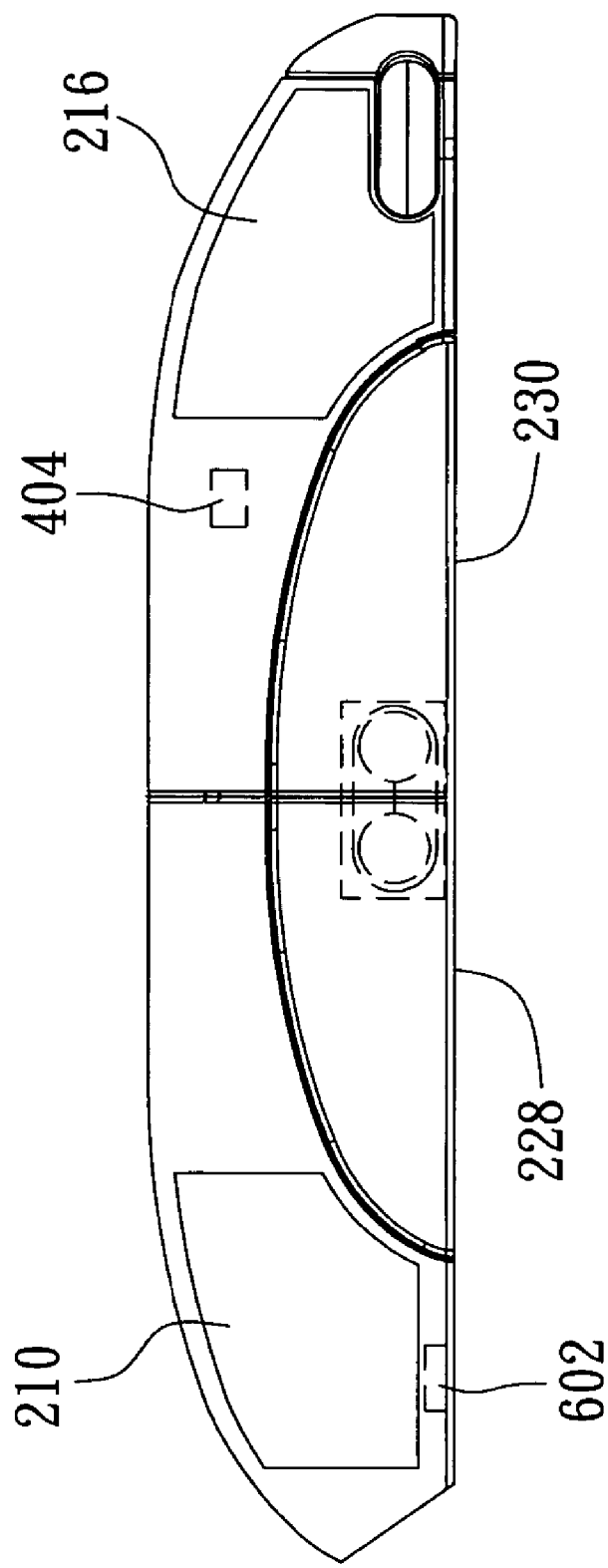
FIG. 6 is a side view of the dual mode computer mouse according to the fourth preferred embodiment of the present invention.

Referring to FIG. 5B, the second button 504 is disposed on the bottom surface 226. When the first engaging end 220 and the second engaging end are engaged together, in other words, the pen-like operable configuration is presented, users can hold the first mouse body 202 from the lower part of the mouse 500 and operate the first button 210 and the second button 504 at the same time.

Embodiment IV

The main difference between dual mode computer mouse 600 of the fourth preferred embodiment of the invention and the dual mode computer mouse 500 of the third preferred embodiment is that the first sensor 603 is disposed on the first engaging sidewall 228. The rest of the essential elements adopt the same numbering and will not be mentioned again.

The first sensor 602 is disposed on the first engaging sidewall 228. When the first engaging end 220 and the second engaging end 222 are engaged together, users can hold the first mouse body 202 and operate the first button 210 and the second button 504 by their fingers at the same time. Also, when the first engaging sidewall 228 moves along a plane, the first sensor 602 can detect the movement of the mouse 600.

According to the present invention, the dual mode computer mouse includes the first mouse body 202 and the second mouse body 204 and the two mouse bodies are hinged with a hinge 218. Accordingly, it is available to shift between the palm-type operable configuration and the pen-like operable configuration, which is different from the conventional limited single operable configuration. Users can therefore change operable configurations according to different software and also have free choices and fun. More importantly, users will no longer suffer from occupational diseases caused by maintaining the same posture for long.

While the invention has been described by way of example and in term s of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A dual mode computer mouse comprising:
   a first mouse body having a first top surface, an inner sidewall, an outer sidewall, and an tail end, the first mouse body having a first sensor, a first button disposed on the first top surface, and a second button disposed on the outer sidewall; and
   a second mouse body having a second top surface, the second mouse body having a third button disposed on the second top surface, and the second mouse body selectively engaging with one of the tail end and the inner sidewall of the first mouse body,
   wherein while the second mouse body is engaging with the inner sidewall of the first mouse body to form a palm-type operable configuration, the first button and the third button are activated, and while the first mouse body is engaging with the tail end of the first mouse body to form a serial pen-like operable configuration, the second button is activated and the first sensor is enabled.

2. The dual mode computer mouse as claimed in claim 1, the first mouse body further comprising a first engaging sidewall and a first engaging end, the second mouse body further comprising a corresponding second engaging sidewall and a corresponding second engaging end, wherein when the first engaging sidewall of the first mouse body and the second engaging sidewall of the second mouse body are engaged together, the second mouse body and the first mouse body are side by side to form a palm-type operable configuration, and when the first engaging end of the first mouse body and the second engaging end of the second mouse body are engaged together, the second mouse body and the first mouse body form a pen-like operable configuration.

3. The dual mode computer mouse as claimed in claim 2, wherein the first engaging end and the second engaging end are both equipped with a magnet for mutual attracting and positioning the first mouse body and the second mouse body in the form of the serial pen-like operable configuration.

4. The dual mode computer mouse as claimed in claim 2, wherein a leading edge of the first mouse body has a first contact plane, the first contact plane and the first engaging sidewall lying at an angle in a range of 90 to 180 degrees, and the first sensor disposed on the first contact plane can be used to detect a motion of the mouse while the contact plane moves along a plane.

5. The mouse as claimed in claim 2, wherein the mouse is further provided with a scrolling wheel either on the first top surface or the second top surface, and users can roll the scrolling wheel while the first engaging sidewall and the second engaging sidewall are engaged together.

6. The dual mode computer mouse as claimed in claim 1, the first mouse body further comprising a first bottom surface opposite to the first top surface, the second mouse body further comprising a second bottom surface opposite to the second top surface, wherein the dual mode computer mouse further comprises a second sensor either on the first bottom surface or the second bottom surface and the second sensor detects a motion of the mouse.

7. The dual mode computer mouse as claimed in claim 1, further comprising an accelerometer chip for detecting the inclination of the mouse, wherein the dual mode computer mouse in the palm-type operable configuration has a smaller inclination than the dual mode computer mouse in the pen-like operable configuration.

8. The dual mode computer mouse as claimed in claim 1, wherein the dual mode computer mouse further comprises a hidden dual hinge for hinging the first mouse body and the second mouse body.

9. The dual mode computer mouse as claimed in claim 8, wherein the dual mode computer mouse further comprises:
   a first circuit board disposed inside the first mouse body and equipped with a first control circuit for controlling the first mouse body;
   a second circuit board disposed inside the second mouse body and equipped with a second control circuit for controlling the second mouse body; and
   a connection wire, which penetrates the hidden dual hinge for electrically connecting the first circuit board and the second circuit board.

10. A dual mode computer mouse comprising:
    a first mouse body, which comprises:
        a first top surface equipped with a first button;
        a first bottom surface opposite to the first top surface;
        a first outer sidewall formed between the first top surface and the first bottom surface;
        at least a second button disposed on the first outer sidewall;
        a first engaging sidewall formed between the first top surface and the first bottom surface, wherein the first engaging side is opposite to the first outer sidewall;
        a first engaging end formed between the first outer sidewall and the first engaging side; and
    a second mouse body movably connected on the first mouse body, which comprises:
        a second top surface equipped with a third button;
        a second bottom surface opposite to the second top surface;
        a second outer sidewall formed between the second top surface and the second bottom surface, and substantially corresponding to the first outer sidewall;
        a second engaging sidewall formed between the second top surface and the second bottom surface and substantially corresponding to the first engaging side and the second engaging side being allocated opposite to the second outer sidewall;
        a second engaging end which corresponds to the first engaging end and formed between the second top surface with the second bottom surface, and also formed between the second outer sidewall with the second engaging sidewall,
    wherein while the first engaging sidewall of the first mouse body and the second engaging sidewall of the second mouse body are engaged together, the first mouse body and the second mouse body are side by side and the first button and the third button are activated, and while the first engaging end and the second engaging end are engaged, the second button is activated.

11. The dual mode computer mouse as claimed in claim 10, wherein the second mouse body and the first mouse body are side by side to form a palm-type operable configuration, which allows users to hold the dual mode computer mouse by palm.

12. The dual mode computer mouse as claimed in claim 10, wherein while the first mouse body are in line with the second mouse body, the dual mode computer mouse is in a pen-like operable configuration, which allows users to operate the dual mode computer mouse like holding a pen, and operate the second button by user's index finger.

13. The dual mode computer mouse as claimed in claim 10, the leading edge of the first mouse body further comprising a first sensor and a first contact plane, wherein the first contact plane and the first engaging sidewall lying at an angle of between 90 to 180 degrees, and the first sensor on the first contact plane detects a motion of the mouse while the contact plane moves along a plane.

14. The dual mode computer mouse as claimed in claim 10, the dual mode computer mouse further comprising a second sensor either on the first bottom surface or the second bottom surface for detecting the motion of the mouse as the first bottom surface moves along a plane.

15. The dual mode computer mouse as claimed in claim 10, wherein the dual mode computer mouse further comprises an accelerometer chip for detecting the inclination of the mouse, wherein the dual mode computer mouse in the palm-type operable configuration has a smaller inclination than the dual mode computer mouse in the pen-like operable configuration.

16. The dual mode computer mouse as claimed in claim 10, wherein the dual mode computer further comprises a hidden dual hinge for hinging the first mouse body and the second mouse body.

17. The dual mode computer mouse as claimed in claim 16, further comprising:
  a first circuit board disposed inside the first mouse body and equipped with a first control circuit for controlling the first mouse body;
  a second circuit board disposed inside the second mouse body and equipped with a second control circuit for controlling the first mouse body; and
  a connection wire, which penetrates the hidden dual hinge for electrically connecting the first circuit board and the second circuit board.

18. A mouse comprising:
  a first mouse body having a first top surface, a first engaging sidewall and a first engaging end;
  a second mouse body comprising a second top surface, a second engaging sidewall and a second engaging end, wherein the second mouse body is hinged to the first mouse body so that the second mouse body can rotate relatively to the first mouse body;
  a first button disposed on the first top surface; and
  a third button disposed on the second top surface, wherein users are allowed to hold the mouse with their palms and to operate the first button and the third button with fingers while the first engaging sidewall and the second engaging sidewall are engaged together, and users are allowed to hold the first mouse body and operate the first button with fingers while the first engaging end and the second engaging end are engaged together.

19. The mouse as claimed in claim 18, the first mouse body further comprising a first outer sidewall opposite to the first engaging sidewall, wherein the mouse further comprises a second button on the first outer sidewall, and when the first engaging end and the second engaging end are engaged together, users can hold the first mouse body and operate the second button by fingers.

20. The mouse as claimed in claim 18, the first mouse body further comprising a first bottom surface opposite to the first top surface, wherein the mouse further comprises a second button on the first bottom surface, and engaging the first engaging end and the second engaging end enables users to hold the first mouse to operate the second button by fingers.

21. The mouse as claimed in claim 18, wherein the mouse further comprises a first sensor on the first engaging sidewall for detecting a motion of the mouse while the first engaging sidewall moves along a plane.

22. The mouse as claimed in claim 18, the mouse further comprising a first sensor and the leading edge of the first mouse body further comprising a first contact plane, wherein the first contact plane and the first engaging sidewall lying at an angle of between 90 to 180 degrees, and the first sensor on the first contact plane detect a motion of the mouse while the contact plane moves along a plane.

23. The mouse as claimed in claim 18, the first mouse body further comprising a first bottom surface opposite to the first top surface, and the second mouse body further comprising a second bottom surface opposite to the second top surface, wherein the mouse further comprises a second sensor, which detects the motion of the mouse as the first bottom surface moves along a plane, either on the first bottom surface or the second bottom surface.

24. The mouse as claimed in claim 18 further comprising a scrolling wheel either on the first top surface or the second top surface, wherein while the first engaging sidewall and the second engaging sidewall are engaged, users can roll the scrolling wheel by fingers.

* * * * *